(12) United States Patent
Wu et al.

(10) Patent No.: US 7,843,103 B2
(45) Date of Patent: Nov. 30, 2010

(54) ELECTRICAL MOTOR

(75) Inventors: Jen-Chieh Wu, Kaohsiung Hsien (TW); Te-Min Kuo, Chia-Yi Hsien (TW)

(73) Assignee: Asia Vital Components., Ltd., Taipei County (TW)

( * ) Notice: Subject to any disclaimer, the term of this patent is extended or adjusted under 35 U.S.C. 154(b) by 0 days.

(21) Appl. No.: 12/560,151

(22) Filed: Sep. 15, 2009

(65) Prior Publication Data
US 2010/0026146 A1    Feb. 4, 2010

Related U.S. Application Data

(63) Continuation of application No. 11/291,155, filed on Dec. 1, 2005, now abandoned.

(51) Int. Cl.
    *H02K 1/12*    (2006.01)
(52) U.S. Cl. .................................. 310/187; 310/216.095
(58) Field of Classification Search .................. 310/179, 310/185–188, 216.029, 216.033, 216.036, 310/216.037, 216.095
See application file for complete search history.

(56) References Cited

U.S. PATENT DOCUMENTS

| | | | | |
|---|---|---|---|---|
| 2,124,427 A | * | 7/1938 | Morrill et al. | 310/198 |
| 2,761,082 A | * | 8/1956 | Chang | 310/187 |
| 2,812,459 A | | 11/1957 | Smith | |
| 2,921,208 A | * | 1/1960 | Morrill | 310/214 |
| 3,062,978 A | * | 11/1962 | Smith | 310/166 |
| 3,235,762 A | * | 2/1966 | Brammerlo | 310/185 |
| 3,622,823 A | | 11/1971 | Broadway et al. | |
| 3,783,318 A | * | 1/1974 | Widstrand | 310/216.014 |
| 3,942,055 A | * | 3/1976 | Hoffmeyer | 310/216.111 |
| 4,038,575 A | * | 7/1977 | Nordebo | 310/179 |
| 4,241,274 A | * | 12/1980 | Brammerlo | 310/216.071 |
| 5,661,355 A | * | 8/1997 | Darceot | 310/180 |
| 5,759,589 A | | 6/1998 | George, Jr. | |
| 5,911,453 A | * | 6/1999 | Boyd, Jr. et al. | 29/596 |
| 5,934,600 A | * | 8/1999 | Darceot | 242/433 |
| 5,998,904 A | * | 12/1999 | Hattori | 310/216.071 |

* cited by examiner

*Primary Examiner*—Dang D Le

(57) ABSTRACT

An electrical motor includes: a rotor; a stator including a stator core that is formed with a plurality of first slot units and a plurality of second slot units which are alternately disposed with the first slot units, each of the first slot units including at least two first slots, each of the second slot units including at least two second slots, the stator core being further formed with a plurality of first poles each disposed between the first slots of a respective one of the first slot units, and a plurality of second poles each disposed between the second slots of a respective one of the second slot units, the depth of each first slot being deeper than that of each second slot; a first winding that is wound on the first poles; and a second winding that is wound on the second poles.

4 Claims, 5 Drawing Sheets

ELECTRICAL MOTOR

This application is a continuation of U.S. application Ser. No. 11/291,155, filed Dec. 1, 2005, now abandoned titled Electrical Motor.

BACKGROUND OF THE INVENTION

1. Field of the Invention

This invention relates to an electrical motor, more particularly to an electrical motor including a stator formed with stator slots having different depths.

2. Description of the Related Art

Conventional electrical motors for electric fans normally include a rotor and a stator that has a stator core provided with an insulator layer thereon and that is formed with a plurality of identical stator slots and a plurality of identical poles, each of which is disposed between two adjacent ones of the stator slots. The stator is normally provided with a starting winding of an insulated wire wound on selected ones of the poles, and a field winding of insulated wires wound on the remaining poles. Since the depths of the stator slots are identical, and since the lengths of the poles are identical, a relatively great portion of the starting winding unavoidably overlaps the field winding on the stator core. As a consequence, the likelihood that the insulation on the insulated wires of the starting winding and the field winding will be damaged during lamination of the starting winding and the field winding on the stator core by a press is relatively high, which can result in short circuit or failure in controlling rotation of the rotor.

SUMMARY OF THE INVENTION

Therefore, the object of the present invention is to provide an electrical motor with a stator that is capable of overcoming the aforesaid drawback of the prior art.

According the present invention, there is provided an electrical motor that comprises: a rotor; a stator disposed concentrically with the rotor, and including a stator core that defines an axis, that has an axially extending surface around the axis, and that is formed with a plurality of angularly displaced first slot units and a plurality of angularly displaced second slot units which are alternately disposed with the first slot units, each of the first slot units including at least two angularly displaced first slots indented from the axially extending surface in radial directions relative to the axis, each of the second slot units including at least two angularly displaced second slots indented from the axially extending surface in radial directions relative to the axis, each of the first slots of the first slot units and the second slots of the second slot units defining a depth measured from the axially extending surface toward the axis, the stator core being further formed with a plurality of first poles, each of which is disposed between the first slots of a respective one of the first slot units and defines adjacent sides of the first slots of the respective one of the first slot units, and a plurality of second poles, each of which is disposed between the second slots of a respective one of the second slot units and defines adjacent sides of the second slots of the respective one of the second slot units, the depth of each of the first slots being deeper than that of each of the second slots; a first winding that is wound on the first poles; and a second winding that is wound on the second poles.

BRIEF DESCRIPTION OF THE DRAWINGS

In drawings which illustrate an embodiment of the invention.

DETAILED DESCRIPTION OF THE PREFERRED EMBODIMENT

Figure 1:
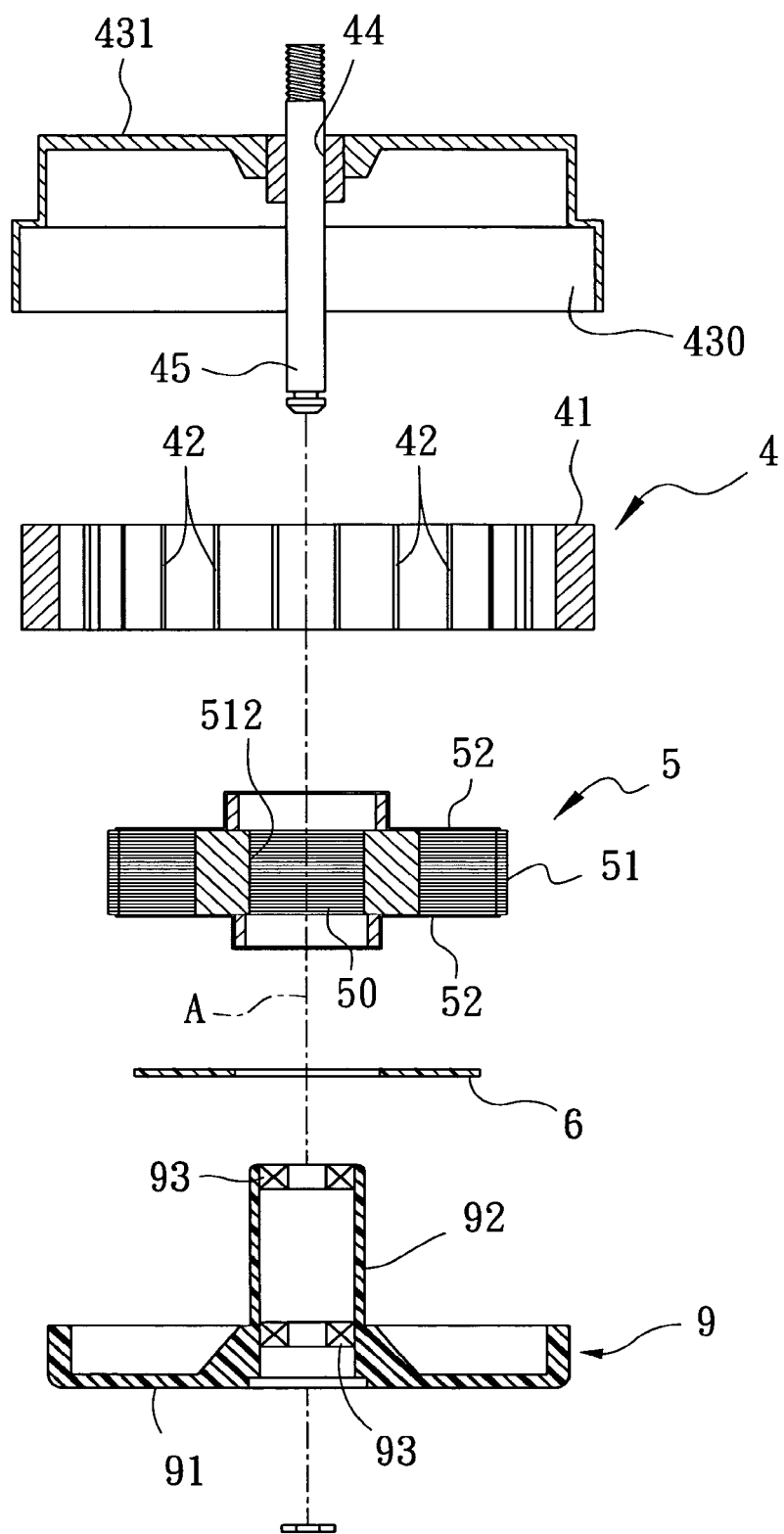
FIG. 1 is an exploded sectional view of the preferred embodiment of an electrical motor according to this invention.
Figure 2:
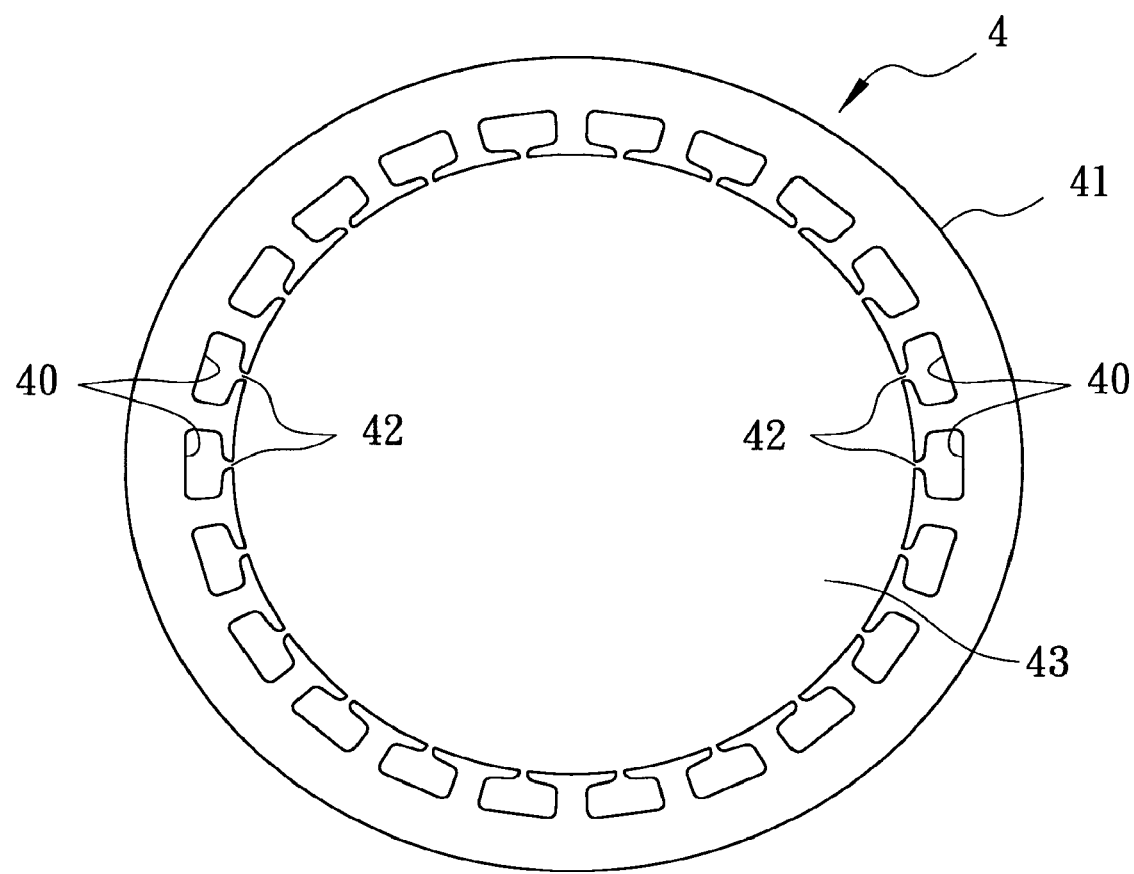
FIG. 2 is a schematic view of a rotor of the preferred embodiment.
Figure 3:
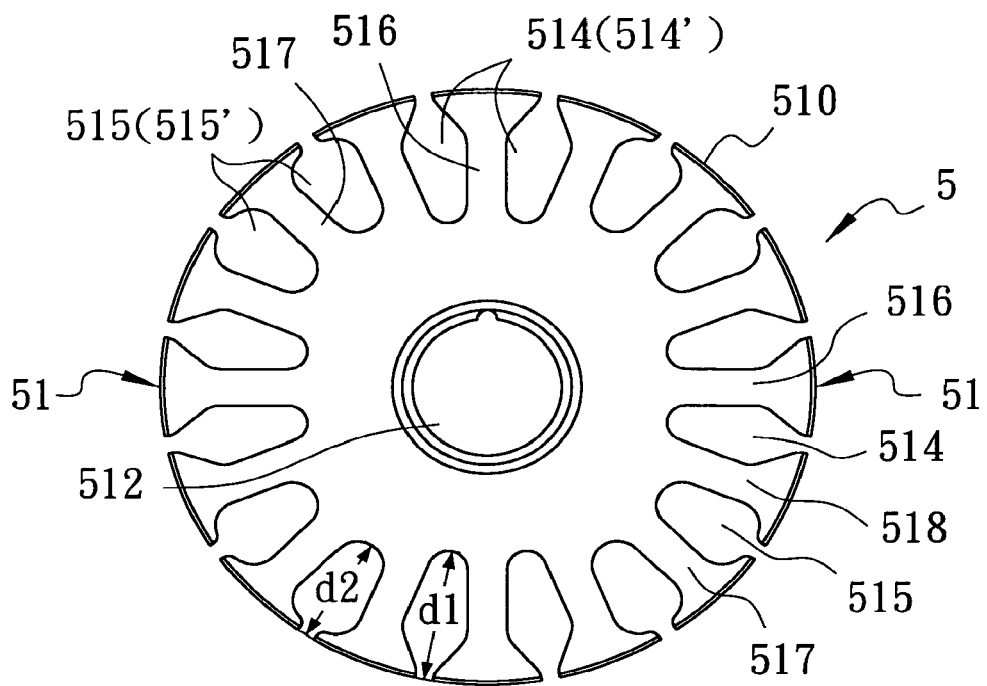
FIG. 3 is a schematic view of a stator of the preferred embodiment.
Figure 4:
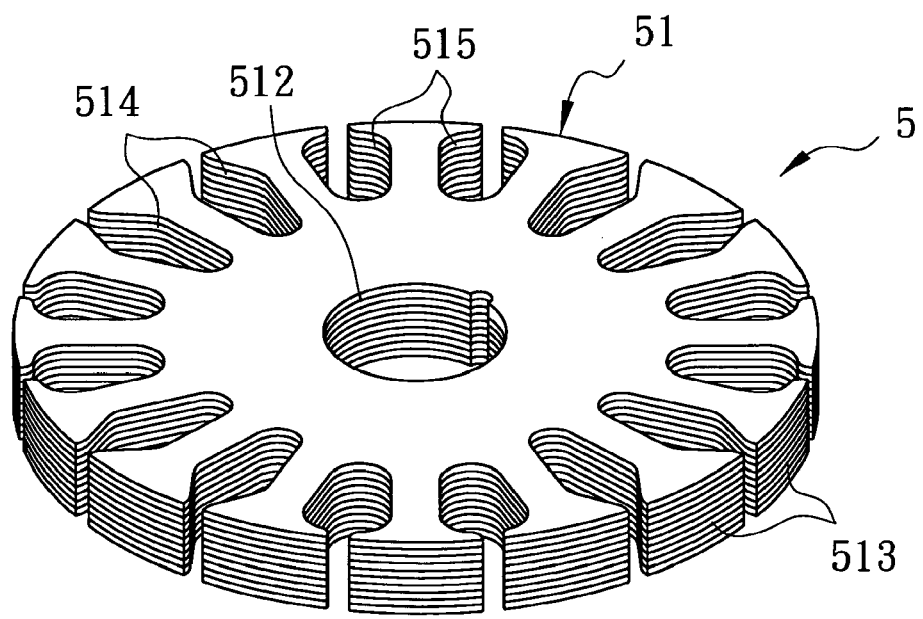
FIG. 4 is a top perspective view of the stator of the preferred embodiment.
Figure 5:
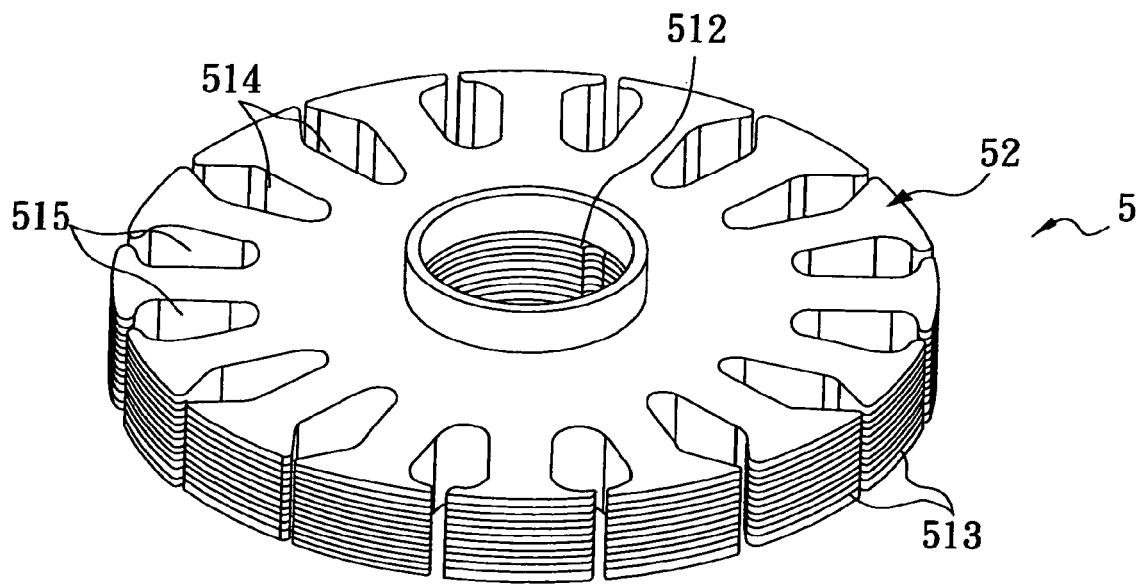
FIG. 5 is a bottom perspective view of the stator of the preferred embodiment.
Figure 6:
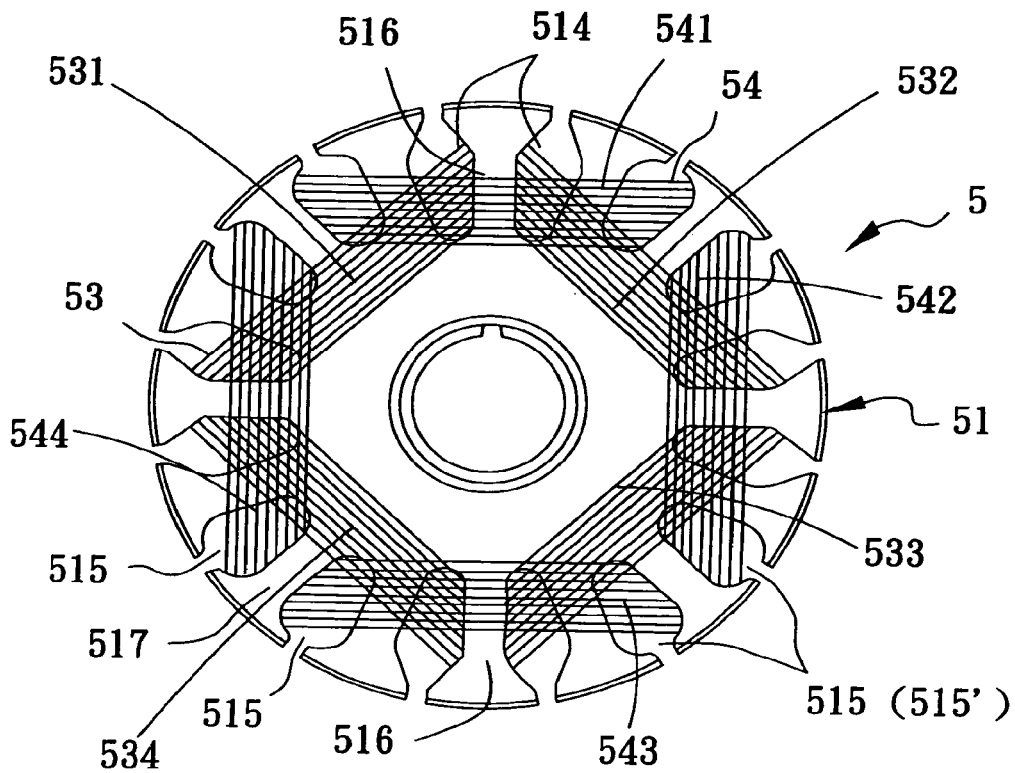
FIG. 6 is a schematic view of the stator of the preferred embodiment provided with a starting winding and a field winding.

FIGS. 1 to 6 illustrate the preferred embodiment of an electrical motor according to the present invention for application to an electric fan.

The electrical motor includes: a rotor 4; a stator 5 disposed concentrically with the rotor 4, and including a stator core 51 that defines an axis (A) that has an axially extending surface 510 around the axis (A), and that is formed with a plurality of angularly displaced first slot units 514' and a plurality of angularly displaced second slot units 515' which are alternately disposed with the first slot units 514', each of the first slot units 514' including at least two angularly displaced first slots 514 indented from the axially extending surface 510 in radial directions relative to the axis (A), each of the second slot units 515' including at least two angularly displaced second slots 515 indented from the axially extending surface 510 in radial directions relative to the axis (A), each of the first slots 514 of the first slot units 514' and the second slots 515 of the second slot units 515' defining a depth ($d_1$, $d_2$) measured from the axially extending surface 510 toward the axis (A), the stator core 51 being further formed with a plurality of first poles 516, each of which is disposed between the first slots 514 of a respective one of the first slot units 514' and defines adjacent sides of the first slots 514 of the respective one of the first slot units 514', and a plurality of second poles 517, each of which is disposed between the second slots 515 of a respective one of the second slot units 515' and defines adjacent sides of the second slots 515 of the respective one of the second slot units 515', the depth ($d_1$) of each of the first slots 514 being deeper than the depth ($d_2$) of each of the second slots 515; a first winding 53 (see FIG. 6) that is wound on the first poles 516; and a second winding 54 that is wound on the second poles 517: so the first winding 53 and said second winding 54 overlap with each other while being wound around the stator core 51; wherein said first winding 53 has a first, a second, a third, and a fourth side 531~534, and said second winding 54 has a fifth, a sixth, a seventh, and an eighth side 541~544; said fifth side 541 intersecting with said first and said second side 531, 532, said sixth side 542 intersecting with said second and said third side 532, 533, said seventh side 543 intersecting with said third and said fourth side 533, 534, and said eighth side 544 intersecting with said first and said fourth side 531, 534.

In this embodiment, the number of the first slot units 514' is four, and the number of the second slot units 515' is also four, which results in four of the first poles 516, and four of the second poles 517. In addition, an intermediate pole 518 (see FIG. 3) is formed on the stator core 51 between each of the first slots 514 and an adjacent one of the second slots 515 such that the intermediate pole 518 is disposed between an adjacent pair of the first and second poles 516, 517, and defines adjacent sides of the respective one of the first slots 514 and the respective one of the second slots 515.

Figure 7:
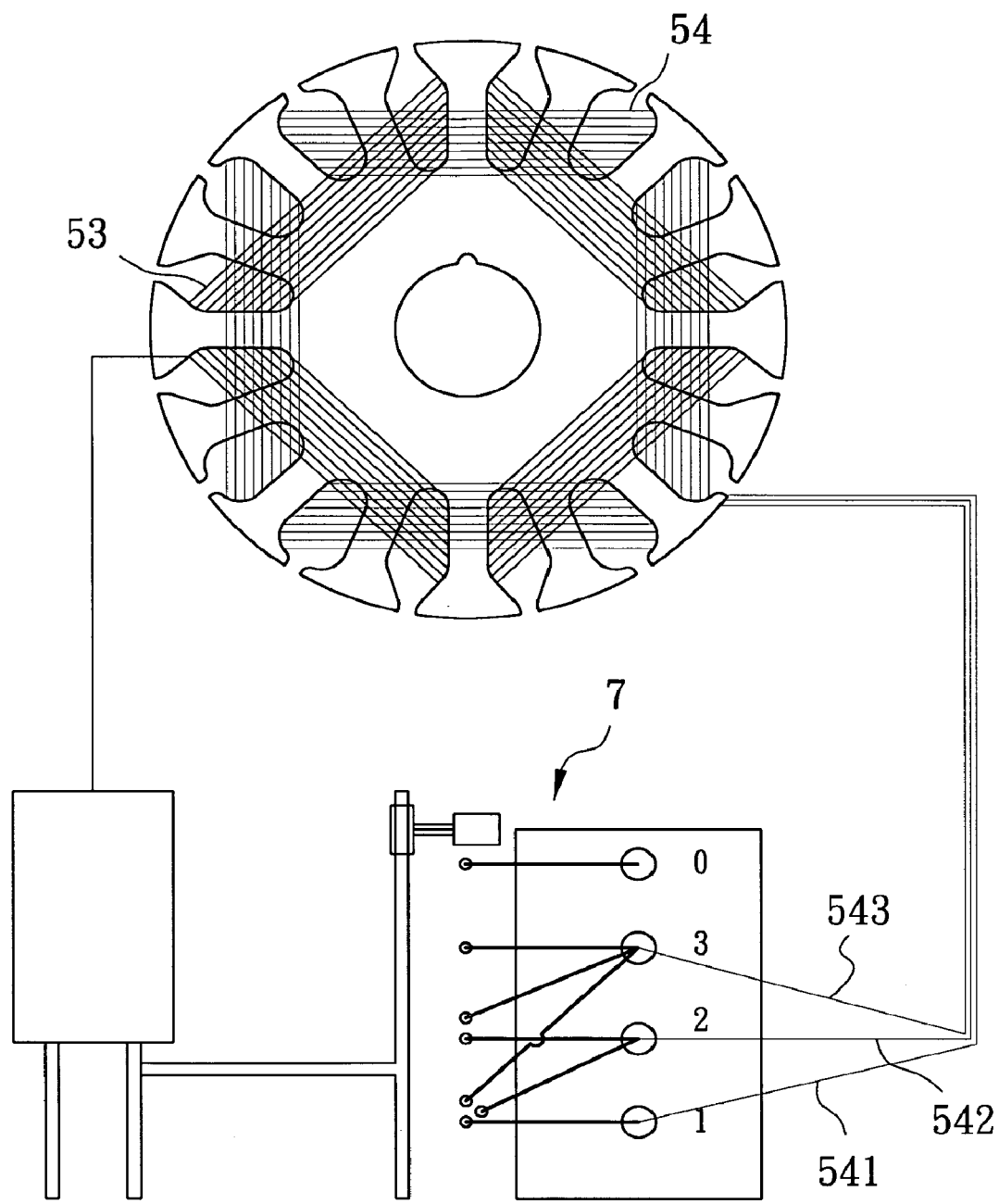
FIG. 7 is a schematic view of the preferred embodiment provided with a switch.

In this embodiment, the first winding 53 serves as a starting winding of the electrical motor, and the second winding 54 serves as a field winding of the electrical motor and includes a plurality of wires 541, 542, 543 (see FIG. 7). A switch 7 is adapted to be connected to a power supply (not shown), is coupled to the second winding 54, and is operable among operation modes that correspond respectively to the numbers of the wires 541, 542, 543 to be electrically connected to the power supply through the switch 7.

Referring back to FIG. 2, the rotor 4 includes an annular silicon steel plate 41 that is formed with a plurality of rotor slots 40 and a plurality of air gaps 42 respectively reduced in cross-section from the rotor slots 40, and that defines a stator-receiving space 43 for receiving the stator 5 therein.

Referring back to FIG. 1, a rotor cover 431 defines a rotor-receiving space 430 for receiving fittingly the rotor 4 therein, and is formed with a central hole 44 for extension of a motor shaft 45 therethrough.

Referring back to FIGS. 4 and 5, in combination with FIG. 1, the stator core 51 of the stator 5 is made by stacking a plurality of punched silicon steel sheets 513, and is connected to a stator-mounting seat 9 that includes a base 91, a bearing shaft 92 standing upright from the base 91, and a pair of bearings mounted in the bearing shaft 92. The stator core 51 has upper and lower surfaces provided with insulator layers 52, and is formed with a central opening 50 extending through the insulator layers 52 on the upper and lower surfaces of the stator core 51 for extension of the bearing shaft 92 therethrough so as to mount the stator 5 on the stator-mounting seat 9. The rotor shaft 45 extends into the bearing shaft 92, and is journalled to the bearings 93.

A conductive plate 6 (see FIG. 1) is mounted on the insulator layer 52 on the lower surface of the stator core 51 for connecting electrically the starting winding 53 and the field winding 54 to the power supply (not shown).

Note that, in this embodiment, the rotor 4 of the electrical motor is constructed to surround the stator 5. Alternatively, the relative positions of the stator 5 and the rotor 4 can be reversed, i.e., the stator 5 can be constructed to surround the rotor 4. The starting winding 53 and the field winding 54 can be made from copper or aluminum wires, and are preferably made from aluminum wires.

By making the first and second slots 514, 515 of the stator core 51 of the stator 5 of the electrical motor of this invention having different depths ($d_1$, $d_2$), the lengths of the first and second poles 516, 517 can be made different so that it is possible to avoid a great portion of the starting winding 53 on the first poles 516 from overlapping the field winding 54 on the second poles 517, thereby lowering the likelihood of damaging the insulation of the insulated wires of the starting winding 53 and the field winding 54 during lamination of the starting winding 53 and the field winding 54 on the stator core 51.

With the invention thus explained, it is apparent that various modifications and variations can be made without departing from the spirit of the present invention.

What is claimed is:

1. An electrical motor comprising:
   a rotor;
   a stator disposed concentrically with said rotor, and including a stator core that defines an axis, that has an axially extending surface around said axis, and that is formed with a plurality of angularly displaced first slot units and a plurality of angularly displaced second slot units which are alternately disposed with said first slot units, each of said first slot units including at least two angularly displaced first slots indented from said axially extending surface in radial directions relative to said axis, each of said second slot units including at least two angularly displaced second slots indented from said axially extending surface in radial directions relative to said axis, each of said first slots of said first slot units and said second slots of said second slot units defining a depth measured from said axially extending surface toward said axis, said stator core being further formed with a plurality of first poles, each of which is disposed between said first slots of a respective one of said first slot units and defines adjacent sides of said first slots of the respective one of said first slot units, and a plurality of second poles, each of which is disposed between said second slots of a respective one of said second slot units and defines adjacent sides of said second slots of the respective one of said second slot units, said depth of each of said first slots being deeper than that of each of said second slots;
   a first winding that is wound on said first poles; and
   a second winding that is wound on said second poles such that said first winding and said second winding overlap with each other while being wound around the stator core; wherein said first winding has a first, a second, a third, and a fourth side, and said second winding has a fifth, a sixth, a seventh, and an eighth side; said fifth side intersecting with said first and said second side, said sixth side intersecting with said second and said third side, said seventh side intersecting with said third and said fourth side, and said eighth side intersecting with said first and said fourth side.

2. The electrical motor of claim 1, wherein said first winding serves as a starting winding of said electrical motor, and said second winding serves as a field winding of said electrical motor and includes a plurality of wires, said electrical motor further comprising a switch that is adapted to be connected to a power supply, that is coupled to said second winding, and that is operable among operation modes that correspond respectively to the numbers of said wires to be electrically connected to the power supply through said switch.

3. An electrical motor comprising:
   a rotor;
   a circular stator disposed concentrically with said rotor, and including a stator core that defines an axis, that has an axially extending surface around said axis, and that is formed with a plurality of angularly displaced first slot units and a plurality of angularly displaced second slot units which are alternately disposed with said first slot units, each of said first slot units including at least two angularly displaced first slots indented from said axially extending surface in radial directions relative to said axis, each of said second slot units including at least two angularly displaced second slots indented from said axially extending surface in radial directions relative to said axis, each of said first slots of said first slot units and said second slots of said second slot units defining a depth measured from said axially extending surface toward said axis, said stator core being further formed with a plurality of first poles, each of which is disposed between said first slots of a respective one of said first slot units and defines adjacent sides of said first slots of the respective one of said first slot units, and a plurality of second poles, each of which is disposed between said second slots of a respective one of said second slot units and defines adjacent sides of said second slots of the respective one of said second slot units, said depth of each of said first slots being deeper than that of each of said second slots;

a first winding that is wound on said first poles; and a second winding that is wound on said second poles such that said first winding and said second winding overlap with each other while being wound around the stator core; wherein said first winding has a first, a second, a third, and a fourth side, and said second winding has a fifth, a sixth, a seventh, and an eighth side; said fifth side intersecting with said first and said second side, said sixth side intersecting with said second and said third side, said seventh side intersecting with said third and said fourth side, and said eighth side intersecting with said first and said fourth side.

4. The electrical motor of claim 3, wherein said first winding serves as a starting winding of said electrical motor, and said second winding serves as a field winding of said electrical motor and includes a plurality of wires, said electrical motor further comprising a switch that is adapted to be connected to a power supply, that is coupled to said second winding, and that is operable among operation modes that correspond respectively to the numbers of said wires to be electrically connected to the power supply through said switch.

\* \* \* \* \*